US012687841B2

(12) United States Patent
Riesgo et al.

(10) Patent No.: US 12,687,841 B2
(45) Date of Patent: Jul. 21, 2026

(54) METHOD AND ASSEMBLY FOR INSPECTING A PLURALITY OF ELEMENTS OF AN INDUSTRIAL PLANT

(71) Applicant: FRAMATOME, Courbevoie (FR)

(72) Inventors: Adrien Riesgo, Villieu-Loyes-Mollon (FR); Guillaume Pons, Mercurol-Veaunes (FR); Elodie Klimczyk, Lyons (FR)

(73) Assignee: FRAMATOME, Courbevoie (FR)

( * ) Notice: Subject to any disclaimer, the term of this patent is extended or adjusted under 35 U.S.C. 154(b) by 462 days.

(21) Appl. No.: 18/033,397

(22) PCT Filed: Oct. 22, 2021

(86) PCT No.: PCT/EP2021/079327
§ 371 (c)(1),
(2) Date: Apr. 24, 2023

(87) PCT Pub. No.: WO2022/084498
PCT Pub. Date: Apr. 28, 2022

(65) Prior Publication Data
US 2023/0409017 A1 Dec. 21, 2023

(30) Foreign Application Priority Data

Oct. 23, 2020 (FR) ..................................... 20 10894

(51) Int. Cl.
*G05B 19/418* (2006.01)
*G06F 16/58* (2019.01)
(52) U.S. Cl.
CPC ... *G05B 19/41875* (2013.01); *G06F 16/5866* (2019.01); *G05B 2219/31304* (2013.01)

(58) Field of Classification Search
None
See application file for complete search history.

(56) References Cited

U.S. PATENT DOCUMENTS

2014/0240486 A1 8/2014 Okada et al.
2021/0103873 A1 4/2021 Zeng et al.

FOREIGN PATENT DOCUMENTS

WO WO2019227602 A1 12/2019

OTHER PUBLICATIONS

International Search Report for PCT/EP2021/079327.
European Search Report FR 2010894.

*Primary Examiner* — Lennin R Rodriguezgonzalez
(74) *Attorney, Agent, or Firm* — Davidson Kappel LLC

(57) ABSTRACT

A method for inspecting a plurality of elements of an industrial plant includes developing an application having a user interface with a command for each element to be inspected; repeatedly acquiring image data of the elements of the industrial plant using a mobile device, and storing the image data in an acquisition memory, each image datum comprising at least one image and a timestamp indicating a time at which the image datum was acquired; activating commands at respective activation times; and associating the image data with the elements. The image data is associated with a given element being chosen exclusively from the image data having a timestamp between the time of activation of the command corresponding to said element and the time of activation of either the preceding or the following command.

16 Claims, 3 Drawing Sheets

METHOD AND ASSEMBLY FOR INSPECTING A PLURALITY OF ELEMENTS OF AN INDUSTRIAL PLANT

The present disclosure relates, in general, to the inspection of industrial plants.

BACKGROUND

An industrial plant such as a nuclear reactor has to undergo regular inspections, in particular visual inspections for checking the condition of certain components.

During the inspection of the so-called RGL (abbreviation of the French Réacteur Grappes Longues [long control rod cluster reactor]) connectors of the control rod cluster command mechanisms, the connectors are disconnected and then reconnected, and the participants take at least four photographs of each of the connectors. Such connectors are used to connect the control rod cluster command mechanisms (French abbreviation: MCG) and control rod cluster position indicators (French abbreviation: IPB) to electrical cabinets located outside the reactor building.

There are up to 89 mechanisms in the same nuclear reactor, so that such an inspection operation generates a large amount of image data to manage (minimum four photographs per mechanism, which gives at least 356 shots).

Said photographs are then manually integrated into an inspection report, one by one, with possible comments.

Such processing is tedious, and it cannot be absolutely excluded that a photograph of one mechanism is falsely assigned to another mechanism.

SUMMARY

In such context, there is a need for an inspection method which would quickly and safely manage a large number of images taken during the inspection of a series of elements of an industrial plant, minimizing the risk of image misappropriation.

To this end, according to a first aspect, the present disclosure relates to a method for inspecting a plurality of elements of an industrial plant, the method comprising the following steps:

a/ development of an application having a user interface with a command for each element to be inspected;

b/ repeated acquisition of image data of the elements of the industrial plant using a mobile device, and storage of the image data in an acquisition memory, each image datum comprising at least one image and a timestamp indicating a time at which the image datum was acquired;

c/ activation of commands at respective activation times;

d/ association of the image data with the elements, the image data associated with a given element being chosen exclusively from the image data having a timestamp between the time of activation of the command corresponding to said element and the time of activation of either the preceding or the following command.

In other words, the image data are classified by a recording chronology. The image data associated with a given element are selected exclusively from the image data recorded between the time of activation of the command corresponding to said element and the time of activation of either the preceding or the following command.

The above is a simple and reliable way to sort image data and to associate same with different elements.

The inspection method can further have one or a plurality of the following features, considered individually or in all technically possible combinations:

for each element, step d/ comprises the following substeps:

transfer of all image data having a timestamp between the time of activation of the command associated with said element and the time of activation of either the preceding or the following command from the acquisition memory to a receiving memory;

transfer of at least some of said image data from the receiving memory to a specific data storage for said element;

the sub-step of transfer from the acquisition memory to the receiving memory is triggered by the activation of the command corresponding to said element or by the activation of the following command;

step d/ comprises a sub-step of erasing the acquisition memory, after the sub-step of transferring image data to the receiving memory has ended;

step b/ comprises a plurality of successive sub-steps, each sub-step corresponding to the acquisition of the image data relating to one of the elements, the command corresponding to said element being activated at the end of said sub-step;

step d/ includes a sub-step of writing, in each of the image data associated with one of the elements, an identification reference of said element;

step d/ comprises a sub-step of assigning to each of the image data associated with one of the elements, a file name containing a reference for identifying said element;

the industrial plant is a nuclear reactor, the elements being chosen from the following list:

elements belonging to control rod cluster command mechanisms;

elements carried by a closing head of a reactor pressure vessel;

elements situated in a reactor zone with a equivalent dose rate greater than 1 mSv/h;

the mobile device is chosen from the following list: camera, video-camera, thermal camera, endoscope, fiberscope;

the user interface comprises a schematic representation of the plant, each command being a touch-sensitive zone of the schematic representation;

the touch-sensitive zone has a first appearance when the command has not yet been activated, and a second appearance different from the first appearance when the command has already been activated.

According to a second aspect, the present disclosure relates to a set for inspecting a plurality of elements of an industrial plant, comprising:

an application having a user interface with a command for each element to be inspected;

a mobile acquisition device for image data of the industrial plant and an acquisition memory configured for storing such image data, each image datum comprising at least one image and a timestamp indicating a time at which the image datum was acquired;

the application being configured so that the activation of the commands, at respective activation times, initiates a transfer from the acquisition memory to a receiving memory of all the image data having a timestamp between the activation time of said command and the activation time of the preceding command.

The inspection set can further have one or a plurality of the following features, considered individually or in all technically possible combinations:

the inspection set includes a specific data storage for each element;

the mobile device is chosen from the following list: camera, video-camera, thermal camera, endoscope, fiberscope;

the user interface comprises a schematic representation of the plant, each command being a touch-sensitive zone of the schematic representation;

the touch-sensitive zone has a first appearance when the command has not yet been activated, and a second appearance different from the first appearance when the command has already been activated.

BRIEF DESCRIPTION OF THE DRAWINGS

Other features and advantages will be clear from the detailed description thereof which is given below as an example, but not limited to, with reference to the enclosed figures, among which.

DETAILED DESCRIPTION

Figure 1:
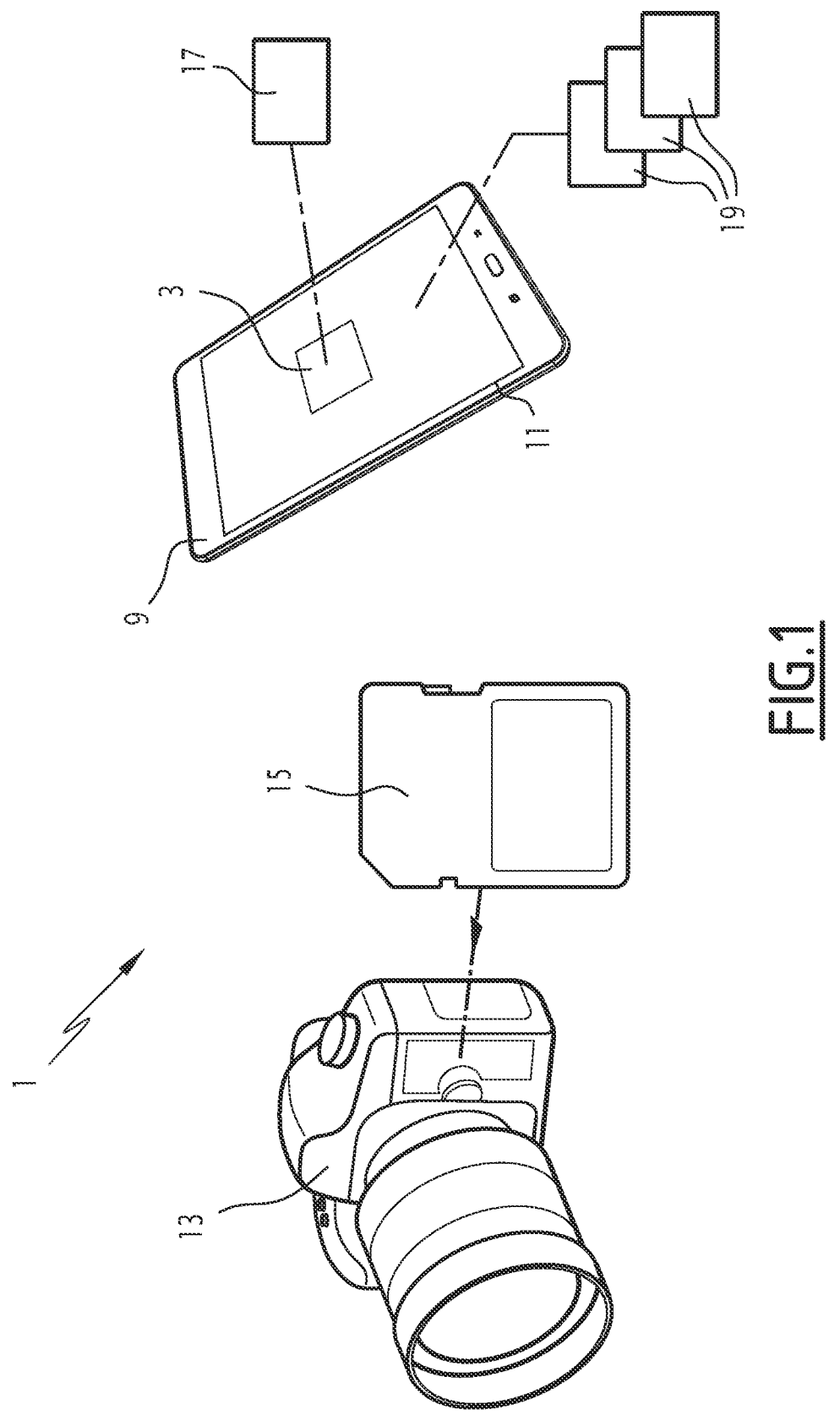
FIG. 1 is a simplified schematic representation of the inspection set according to the present disclosure.

The inspection set 1 shown in FIG. 1 is intended for inspecting a plurality of elements of an industrial plant.

The industrial plant is e.g. a nuclear plant, typically a nuclear reactor.

According to an example of application, such elements are elements belonging to the control rod cluster command mechanisms. The elements are e.g. the RGL connectors of the control rod cluster command mechanisms. The RGL connectors are carried by the closing head of the pressure vessel of the nuclear reactor.

Figure 2:
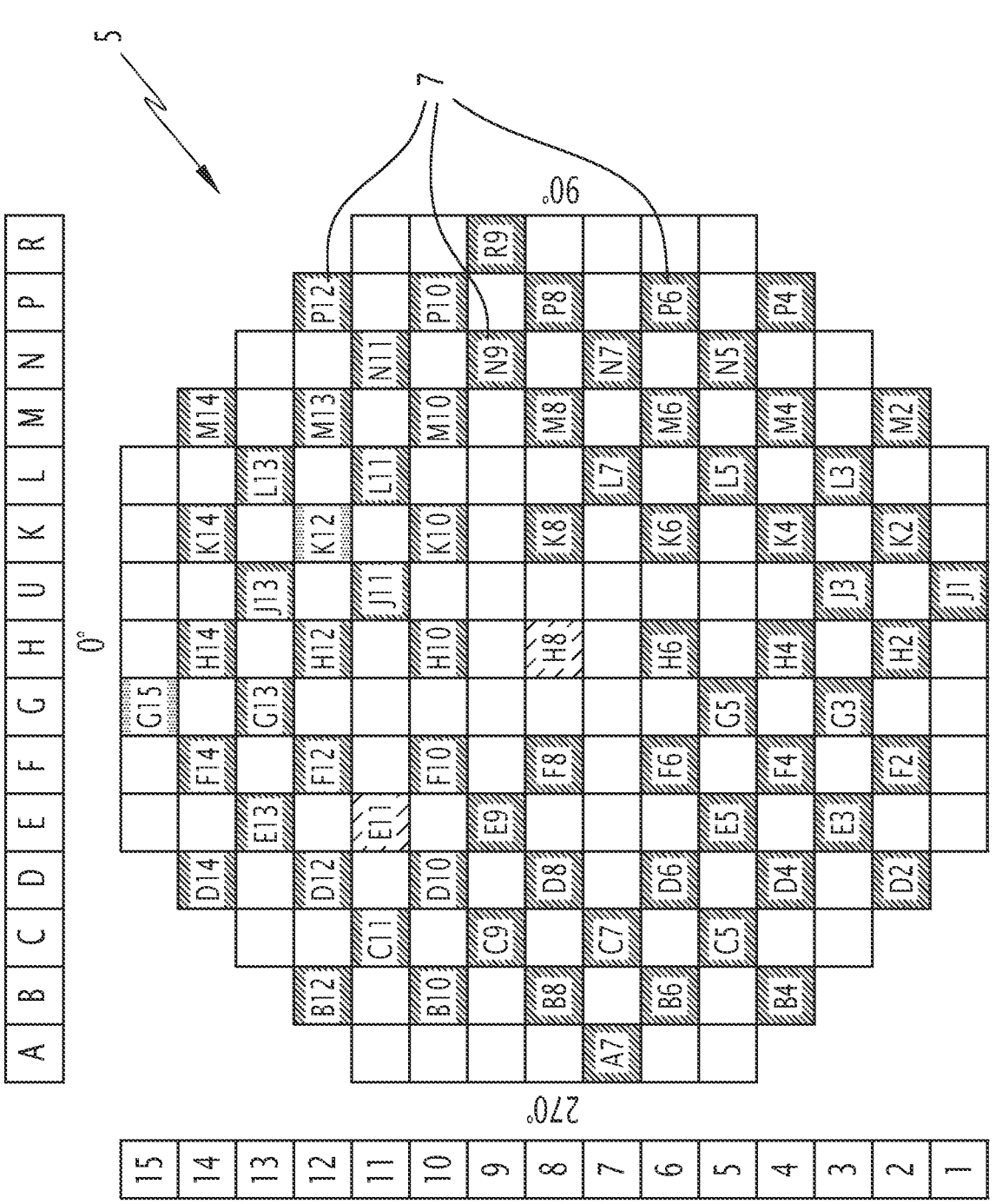
FIG. 2 is a simplified schematic representation of the user interface of the inspection set shown in FIG. 1.

The set 1 comprises an application 3 having a user interface 5 with a command 7 for each element to be inspected (FIG. 2).

The application 3 is loaded on a digital apparatus 9. Such device is typically a mobile device such as a tablet, a laptop or mobile phone. In a variant, the application 3 is loaded on a fixed digital device such as a desktop computer.

The user interface 5 is displayed on the screen 11 of the digital apparatus.

The user interface 5 comprises a schematic representation of the plant.

In the example shown, the nuclear reactor is schematically represented in plan view by a grid, each cell of the grid corresponding to the position of a nuclear fuel assembly. The columns of the grid are identified by a letter comprised between A and R. The grid lines are identified by a number comprised between 1 and 15.

Each command 7 is a touch-sensitive zone of the schematic representation.

In the case shown, each touch-sensitive zone is a cell of the grid, corresponding to the position of the RGL connector.

The touch-sensitive cells bear an alphanumeric code, including the letter defining the column wherein the cell is located and the number defining the line wherein the cell is located.

The non-touch-sensitive cells, which are not a command corresponding to one of the elements to be inspected, do not bear any alphanumeric code.

The inspection set 1 further includes a mobile apparatus 13 for acquiring image data of the industrial plant and an acquisition memory 15 configured for storing the image data.

The mobile device 13 is chosen from the following list: camera, video camera, thermal camera, endoscope, fiberscope.

In the example shown, the mobile device 13 is a digital camera.

The acquisition memory 15 is typically a memory card, integrated into the mobile device, e.g. an SD card.

Each image datum includes at least one image and a timestamp indicating a time at which the image datum was acquired. The digital stamp indicates the date and time of the shot.

The inspection set 1 further includes a memory 17 for receiving image data coming from the acquisition memory, and a data storage 19 for each element to be inspected.

The receiving memory 17 is e.g. a memory of the digital apparatus 9.

Each storage 19 is intended for storing the image data of only one element to be inspected. All image data relating to such element is stored in said storage.

The storages 19 are e.g. memories of the digital apparatus 9.

The application 3 is configured so that the commands 7 are activated at respective activation times.

The commands 7 are activated at respective successive activation times, i.e. one after the other.

The application 3 is configured so that the activation of a command 7 initiates a transfer from the acquisition memory 15 into the receiving memory 17 of all the image data having a timestamp between the time of activation of said command and the time of activation of the preceding command.

The commands 7 are activated manually, by an operator, according to the order in which the image data is acquired, as explained below.

Typically, the elements are inspected one after the other. In other words, the image data relating to the same given E1 element are all acquired in succession one after the other, and an inspection of the following element E2 begins only after all the data for the given element E1 have been acquired.

Figure 3:
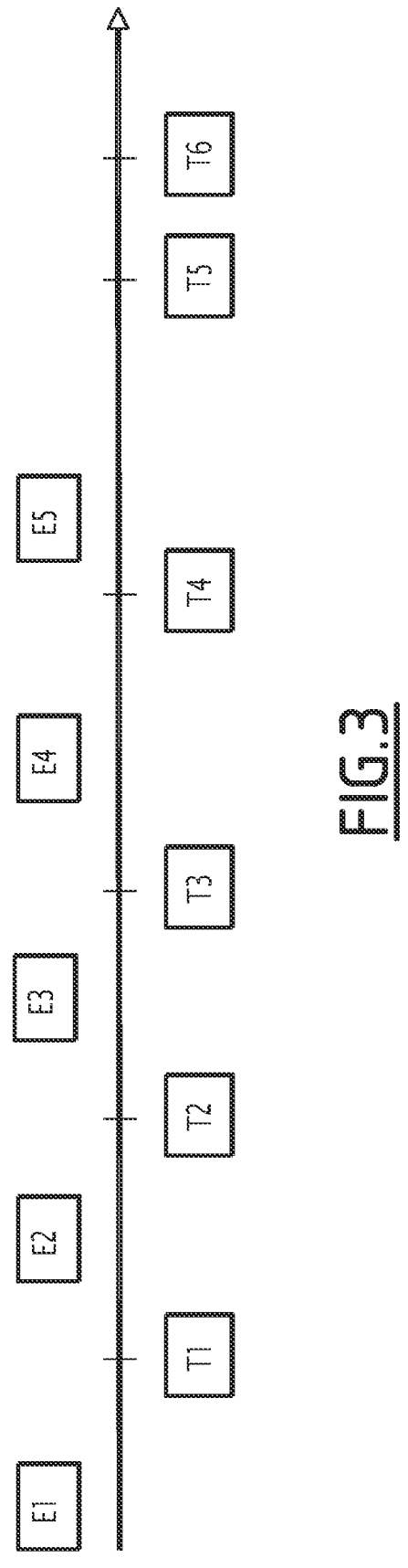
FIG. 3 is a time axis indicating the activation times of the commands with respect to the image taking periods.

The command 7 relating to the given element E1 is activated when all the image data relating to the given element E1 have been acquired (reference T1 in FIG. 3). The command 7 relating to the following element E2 is activated when all the image data relating to the following element E2 have been acquired (reference T2 in FIG. 3). Thus, the activation of the command 7 relating to the following element E2 leads to the transfer of only the image data relating to the following element E2.

Advantageously, each touch-sensitive zone has a first appearance when the command 7 has not yet been activated, and a second appearance different from the first appearance when the command 7 has already been activated.

The user can thus easily see which elements have already been inspected, and which elements remain to be inspected.

The touch-sensitive zone e.g. has a first color before activation, and a second color after activation. In the example shown, the zone is red before activation and green after activation.

The transfer of the image data between the acquisition memory 15 and the receiving memory 17 is preferentially carried out by radio wave, e.g. by Wi-Fi.

For this purpose, the memory card is, e.g. a Wi-Fi SD card such as Flashair.

The application 3 is configured for requesting the digital device 9 to connect through Wi-Fi to the SD card when a data transfer is to be performed.

The inspection method of the present disclosure will now be presented in detail.

Such method is specially adapted to be implemented with the inspection set 1 described hereinabove. Conversely, the inspection set 1 is specially designed for being used in the method of the present disclosure.

The method is intended for the inspection of a plurality of elements of an industrial plant.

As indicated hereinabove, the elements are e.g. the RGL connectors of the control rod cluster command mechanisms.

The method comprising the following steps:

a/ developing an application 3 having a user interface 5 with a command 7 for each element to be inspected;

b/ repeated acquisition of image data of the elements of the industrial plant using a mobile device 9, and storage of the image data in an acquisition memory 15, each image datum comprising at least one image and a timestamp indicating a time at which the image datum was acquired;

c/ activation of commands 7 at respective activation times;

d/ association of image data to elements.

The application 3 is as described hereinabove.

Step b/, as illustrated in FIG. 3, comprises a plurality of successive sub-steps E1, E2, E3, etc.

Each sub-step is the acquisition of image data relating to one of the elements.

Specifically, all image data relating to a given element are acquired during the corresponding sub-step, and only during said sub-step.

In other terms, the elements are inspected one after the other. The image data relating to the same element are all acquired in succession one after the other, and an inspection of the following element begins only after all the data for the given element have been acquired.

The commands 7 are activated at respective successive activation times.

The command 7 corresponding to a given element is activated at the end of the sub-step of acquiring the image data relating to said given element. The command is activated before the start of the sub-step of acquiring image data for the following element. The commands are represented in FIG. 3 by the references T1, T2, T3 etc.

The image data are typically acquired by an operator present on site, carrying the acquisition device 13.

The activation of the commands 7 is carried out by another operator, located remotely and communicating with the on-site operator.

The on-site operator notifies the remote operator that he/she has finished acquiring image data relating to a given element, and the remote operator activates the command which initiates the transfer of the image.

The mobile device 9 and the acquisition memory 15 are as described hereinabove.

Step d/ includes, for each element, the following sub-steps:

transfer of all image data having a timestamp between the time of activation of the command associated with said element and the time of activation of either the preceding or the following command, from the acquisition memory 15 into a receiving memory 17;

transfer of at least some of said image data from the receiving memory 17 into a data storage 19 specific for said element.

The receiving memory 17 and the data storage 19 specific to each element are as described hereinabove.

The sub-step of transfer from the acquisition memory 15 into the receiving memory 17 is initiated by the activation of the command 7 corresponding to said element.

The transfer is preferably carried out by radio wave e.g. by Wi-Fi.

Step d/ comprises a sub-step of erasing the acquisition memory 15, after the sub-step of transferring the image data to the receiving memory 17 has ended.

Thereby, when a command 7 is activated, the acquisition memory 15 contains only the image data acquired since the preceding transfer.

However, all image data remain stored in another memory of the mobile device 19.

The transfer of the image data from the receiving memory 17 into the specific data storage 19 is typically carried out manually by the user. The user examines the images and determines whether or not the images should be kept.

Thereby, the image data associated in step d/ with a given element are chosen exclusively from the image data having a timestamp between the time of activation of the command corresponding to said element and the time of activation of the preceding command.

As shown in FIG. 3, the image data are the image data acquired during the inspection sub-step of the corresponding element.

Preferentially, step d/ comprises a sub-step of writing an identification reference of said element in each of the image data associated with one of the elements. The element identification reference e.g. can be added to the photograph by means of image processing software. The identification reference can be the alphanumeric code of the touch-sensitive cell in the example shown in FIG. 2.

Preferentially, step d/ comprises a sub-step of assigning, to each of the image data associated with one of the elements, a file name containing a reference for identifying said element. The identification reference can be the alphanumeric code of the touch-sensitive cell in the example shown in FIG. 2.

As described hereinabove, each touch-sensitive zone of the user interface 5 has a first appearance when the command 7 has not yet been activated, and a second appearance different from the first appearance when the command 7 has already been activated.

The method and inspection set have been described for an application to the inspection of RGL connectors on the closing head of a nuclear reactor pressure vessel.

The method and inspection set are particularly well suited to all applications wherein images of multiple elements have to be taken under restrictive conditions: difficult access zones, poor lighting conditions, high equivalent dose rate, high temperature, environment requiring wearing waterproof clothing, etc.

The method and inspection set are particularly suitable for inspecting:

elements belonging to the control rod cluster command mechanisms;

elements carried by the closing head of the reactor pressure vessel;

elements located in a reactor zone having a equivalent dose rate greater than 1 mSv/h, typically greater than 3 mSv/h.

The method and inspection set are e.g. used:

for the inspection of elements located in rooms close to the pressure vessel;

for the inspection of elements located at the bottom of the spent fuel pool, in particular in the spent fuel pool or spent fuel pools of the reactor building;

for the inspection of elements located behind pipes;

within the framework of investigations such as the Primary Hydrostatic Test (French abbreviation EPH), which require many shots of different equipment items located in many rooms.

The method and inspection set allow any type of acquisition device to be used, in particular wireless shooting apparatuses (e.g. cameras). The work of operators making the shots is in this way greatly facilitated, especially when the environment is restrictive.

The method and inspection set make it easy to associate image data with the corresponding element, with reduced risk of error, without the need for post-command sorting.

In this way, creating inspection reports is greatly facilitated.

It then becomes possible to produce more thorough reports, comprising a greater number of images of the inspected elements.

It has been described above that the image data associated with a given element were chosen exclusively from the image data having a timestamp between the time of activation of the command corresponding to said element and the time of activation of the preceding command. In a variant, the image data associated with a given element are chosen exclusively from the image data having a timestamp between the time of activation of the command corresponding to said element and the time of activation of the following command.

In other words, the sub-step of transferring image data relating to an element from the acquisition memory to the receiving memory is initiated not by the activation of the command relating to said element, but by the activation of the following command.

In the example above, the command for each element is activated at the end of a sub-step during which only image data for said element are acquired.

According to a non-preferred variant, it is possible to acquire during such sub-step not only the image data relating to said element but also some other image data, which are then sorted manually by the user.

According to a variant of embodiment, the acquisition memory is not integrated into the mobile apparatus for acquiring the image data. The acquisition memory is remote, e.g. on a server e.g.

Likewise, the receiving memory and/or the data storages are not necessarily in the digital apparatus receiving the application 3. Same can be remote, e.g. on a server.

What is claimed is:

1. A method of inspecting a plurality of elements of an industrial plant, the method comprising the steps of:

creating an application having a user interface having a command for each element to be inspected;

repeatedly acquiring image data of the elements of the industrial plant using a mobile device, and storage of the image data in an acquisition memory, each image data comprising at least one image and a timestamp indicating a time at which the image data was acquired;

activating the commands at respective activation times; and associating the image data with the elements, the image data associated with a given element being chosen exclusively from the image data having a timestamp between the time of activation of the command corresponding to said element and the time of activation of a preceding or following command, wherein the associating step comprises, for each element, the following sub-steps:

transferring all image data having a timestamp between the time of activation of the command associated with said element and the time of activation of either the preceding or the following command, from the acquisition memory into a receiving memory; and transferring at least one of said image data from the receiving memory to a data storage specific for said element, wherein the associating step comprises a sub-step of erasing the acquisition memory after the sub-step of transferring the image data to the receiving memory has ended.

2. The method according to claim 1, wherein the sub-step of transfer from the acquisition memory to the receiving memory is initiated by the activation of the command corresponding to said element or by activation of the following command.

3. The method according to claim 1, wherein the associating step comprises a plurality of successive sub-steps, each sub-step corresponding to the acquisition of image data relating to one of the elements, the command corresponding to said element being activated at an end of said sub-step.

4. The method according to claim 1, wherein the associating step comprises a sub-step of writing, in each of the image data associated with one of the elements, an identification reference of said element.

5. The method according to claim 1, wherein the associating step comprises a sub-step of assigning to each of the image data associated with one of the elements, a file name containing a reference for identifying said element.

6. The method according to claim 1, wherein the industrial plant is a nuclear reactor, the elements being selected from the following list:

elements belonging to control rod cluster command mechanisms;

elements carried by a closing head of a reactor pressure vessel;

elements located in a reactor zone with a dose equivalent flow-rate greater than 1 mSv/h.

7. The method according to claim 1, wherein the mobile device is selected from the following list: a camera, a video camera, a thermal camera, an endoscope, a fiberscope.

8. The method according to claim 1, wherein the user interface comprises a schematic representation of the plant, each command being a touch-sensitive zone of the schematic representation.

9. The method according to claim 8, wherein the touch-sensitive zone has a first appearance when the command has not yet been activated, and a second appearance different from the first appearance when the command has already been activated.

10. A method of inspecting a plurality of elements of an industrial plant, the method comprising the steps of:

creating an application having a user interface having a command for each element to be inspected;

repeatedly acquiring image data of the elements of the industrial plant using a mobile device, and storage of the image data in an acquisition memory, each image data comprising at least one image and a timestamp indicating a time at which the image data was acquired;

activating the commands at respective activation times; and associating the image data with the elements, the image data associated with a given element being chosen exclusively from the image data having a timestamp between the time of activation of the command corresponding to said element and the time of activation of a preceding or following command, wherein the user interface comprises a schematic representation of the plant, each command being a touch-sensitive zone of the schematic representation.

11. The method as recited in claim 10 wherein the framework of investigations is the Primary Hydrostatic Test.

12. A method of inspecting a plurality of elements of an industrial plant, the method comprising the steps of:

creating an application having a user interface having a command for each element to be inspected;

repeatedly acquiring image data of the elements of the industrial plant using a mobile device, and storage of the image data in an acquisition memory, each image data comprising at least one image and a timestamp indicating a time at which the image data was acquired;

activating the commands at respective activation times; and associating the image data with the elements, the image data associated with a given element being chosen exclusively from the image data having a timestamp between the time of activation of the command corresponding to said element and the time of activation of a preceding or following command, wherein the industrial plant is a nuclear reactor, the elements being selected from the following list:

elements belonging to control rod cluster command mechanisms;

elements carried by a closing head of a reactor pressure vessel;

elements located in a reactor zone with a dose equivalent flow-rate greater than 1 mSv/h;

elements located in rooms close to the pressure vessel;

elements located at the bottom of the spent fuel pool; or elements located behind pipes;

the method being used within a framework of investigations requiring a plurality of shots of different equipment items located in a plurality of rooms.

13. An inspection set for inspecting a plurality of elements of an industrial plant, the inspection set comprising:

an application having a user interface with a command for each element to be inspected; and a mobile acquisition device for image data of the industrial plant and an acquisition memory configured for storing such image data, each image datum comprising at least one image and a timestamp indicating a time at which the image datum was acquired;

the application being configured so that an activation of the commands, at respective activation times, initiates a transfer from the acquisition memory into a receiving memory of all image data having a timestamp between the time of activation of said command and the time of activation of a preceding command, wherein the inspection set comprises a data storage specific for each element.

14. The inspection set according to claim 13, wherein the mobile device is selected from the following list: a camera, a video camera, a thermal camera, an endoscope, a fiberscope.

15. The inspection set according to claim 13, wherein the user interface comprises a schematic representation of the industrial plant, each command being a touch-sensitive zone of the schematic representation.

16. The inspection set according to claim 15, wherein the touch-sensitive zone has a first appearance when the command has not yet been activated, and a second appearance different from the first appearance when the command has already been activated.

* * * * *